(12) United States Patent
Kuwamura

(10) Patent No.: US 11,442,668 B2
(45) Date of Patent: Sep. 13, 2022

(54) PRIORITIZING VOLUME ACCESSES IN MULTI-VOLUME STORAGE DEVICE BASED ON EXECUTION PATH OF A SERVICE

(71) Applicant: FUJITSU LIMITED, Kawasaki (JP)

(72) Inventor: Shinya Kuwamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/351,290

(22) Filed: Jun. 18, 2021

(65) Prior Publication Data
US 2022/0156005 A1 May 19, 2022

(30) Foreign Application Priority Data

Nov. 18, 2020 (JP) .............................. JP2020-191676

(51) Int. Cl.
*G06F 3/06* (2006.01)
*G06F 16/25* (2019.01)
*G06F 13/20* (2006.01)

(52) U.S. Cl.
CPC .......... *G06F 3/0659* (2013.01); *G06F 3/0611* (2013.01); *G06F 3/0644* (2013.01); *G06F 3/0673* (2013.01); *G06F 16/252* (2019.01); *G06F 13/20* (2013.01)

(58) Field of Classification Search
CPC .... G06F 3/0659; G06F 16/252; G06F 3/0611; G06F 3/0644; G06F 3/0673; G06F 9/4881; G06F 13/20–378
See application file for complete search history.

(56) References Cited

U.S. PATENT DOCUMENTS

| 2010/0274549 | A1* | 10/2010 | Tal | ........................ | G06F 30/327 703/13 |
| 2014/0165064 | A1 | 6/2014 | Takeda et al. | | |
| 2017/0364811 | A1 | 12/2017 | Malecki et al. | | |
| 2018/0349168 | A1 | 12/2018 | Ahmed | | |

FOREIGN PATENT DOCUMENTS

| JP | 2014-115826 A | 6/2014 |
| JP | 2019-525285 A | 9/2019 |

* cited by examiner

*Primary Examiner* — Charles Rones
*Assistant Examiner* — Hewy H Li
(74) *Attorney, Agent, or Firm* — Fujitsu Patent Center

(57) ABSTRACT

A service management device includes a memory, and a processor coupled to the memory and configured to acquire respective execution times of programs that implement a service, identify a first volume having a largest influence on a response time of the service based on the respective execution times of the programs, where the first volume being any one of volumes of a storage device, and at least one of the programs writing and reading data to and from the storage device, and set a priority of writing and reading of data to and from the first volume higher than priorities of writing and reading of data to and from a remaining volume of the volumes.

5 Claims, 14 Drawing Sheets

FIG. 12

<EXECUTION-TIME INFORMATION>

| PROGRAM | EXECUTION TIME (ms) | SUM OF EXECUTION TIMES FROM FRONT END (ms) |
|---|---|---|
| FRONT END (IMAGE) 31a | 1 | 1 |
| FRONT END 31b | 1 | 1 |
| LOGIC (IMAGE) 32a | 2 | 3 |
| LOGIC (TEXT) 32b | 2 | 3 |
| LOGIC (USER) 32c | 1 | 2 |
| LOGIC (ARTICLE) 32d | 2 | 5 |
| DBMS (IMAGE) 33a | 5 | 10 |
| DBMS (ARTICLE) 33b | 10 | 15 |
| DBMS (USER) 33c | 1 | 3 |

… … …

PRIORITIZING VOLUME ACCESSES IN MULTI-VOLUME STORAGE DEVICE BASED ON EXECUTION PATH OF A SERVICE

CROSS-REFERENCE TO RELATED APPLICATION

This application is based upon and claims the benefit of priority of the prior Japanese Patent Application No. 2020-191676, filed on Nov. 18, 2020, the entire contents of which are incorporated herein by reference.

FIELD

A certain aspect of embodiments described herein relates to a service management device, a service management method, and a non-transitory computer-readable recording medium.

BACKGROUND

With the development of cloud computing technology, microservice architecture, which provides a single service by combining multiple programs, is becoming more and more popular. When a program in the microservice architecture references a database, the response time of the service may be delayed due to the time required to write and read data to and from the database. Note that the technique related to the present disclosure is also disclosed in Japanese Laid-Open Patent Publication Nos. 2019-525285 and 2014-115826 and U.S. Patent Application Publication No. 2018/0349168.

SUMMARY

According to an aspect of the embodiments, there is provided a service management device including: a memory; and a processor coupled to the memory and configured to: acquire respective execution times of programs that implement a service, identify a first volume having a largest influence on a response time of the service based on the respective execution times of the programs, where the first volume being any one of volumes of a storage device, and at least one of the programs writing and reading data to and from the storage device, and set a priority of writing and reading of data to and from the first volume higher than priorities of writing and reading of data to and from a second volume that is any one of the volumes other than the first volume.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 schematically illustrates execution-time information in accordance with the embodiment.

DESCRIPTION OF EMBODIMENTS

Prior to the description of an embodiment, what the inventor studied will be described.

Figure 1:
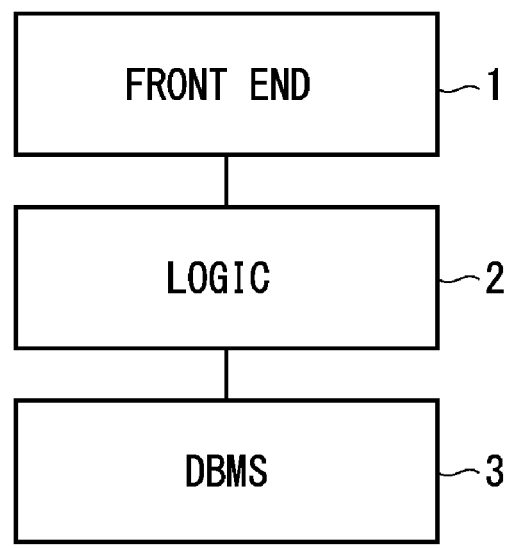
FIG. 1 is a schematic diagram of three-tiered architecture that implements a web service.

FIG. 1 is a schematic diagram of three-tiered architecture that implements a web service.

Here, the three-tiered architecture will be described using a social networking service (SNS) as an example of the web service. In the three-tiered architecture, the web service is implemented by three layers: a front end L, a logic 2, and a database management system (DBMS) 3. The front end 1 is a program that receives various types of data from a user terminal. For example, when the user terminal posts an article to the SNS, the front end 1 receives user information, and text data and image data pertaining to the article.

The logic 2 is a program that performs various processes on the data received by the front end 1. As an example, the logic 2 performs user authentication based on the user information.

The DBMS 3 is a program that writes various data processed by the logic 2 to a storage device (not illustrated), and reads the data from the storage device.

Figure 2:
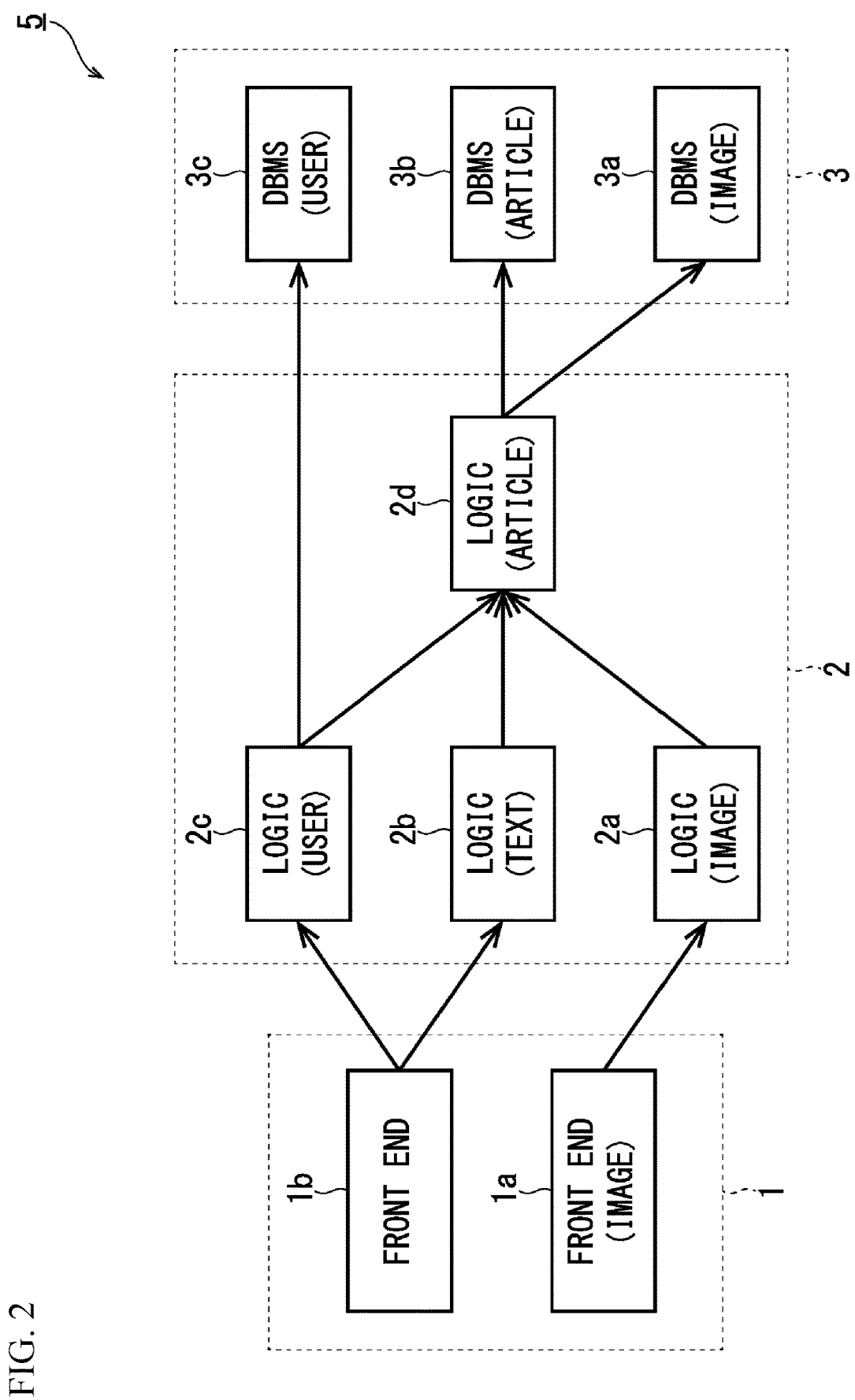
FIG. 2 is a schematic diagram of a system that provides a service equivalent to the web service illustrated in FIG. 1 with use of microservice architecture.

FIG. 2 is a schematic diagram of a system that provides a service equivalent to the web service illustrated in FIG. 1 with use of microservice architecture.

As illustrated in FIG. 2, in a service 5, the program is broken down by functions. For example, the front end 1 is broken down into a front end 1a that receives image data, and a front end 1b that receives data other than the image data.

The logic 2 is broken down into logics 2a to 2d for each function. The logic 2a is a program that performs a predetermined process on the image data received by the front end 1a. The logic 2b is a program that performs a predetermined process on the text data received by the front end 1b. The logic 2c is a program that performs user authentication based on the user information received by the front end 1b. The logic 2d is a program that generates an article that incorporates the text data and the image data when the user authentication succeeds.

Furthermore, the DBMS 3 is broken down into DBMSs 3a to 3c. The DBMS 3a is a program that stores the image data in the storage device, and the DBMS 3b is a program that stores the article in the storage device. The DBMS 3c is a program that stores the user information in the storage device.

The service such as an SNS requires fast response time. Thus, in the service 5, response time tends to be more important than throughput. The response time is the time from when the service 5 receives a request for processing from the user terminal to when the service 5 returns a notification indicating that the processing is completed to the user terminal. The response time is important also in systems for electronic commerce, Internet banking, and online gaming. Although the required response time depends on systems, a response time equal to or less than, for example, 10 ms to 100 ms may be required.

In the service 5, the I/O time during which the DBMSs 3a to 3c write data to the storage device or the DBMSs 3a to 3c read data from the storage device may become a bottleneck, resulting in long response time. To reduce the response time in such a case, it may be considered to set the priorities of I/O requests issued by the DBMSs 3a to 3c to the operating system (OS) higher than the current priorities for all of the DBMSs 3a to 3c. The I/O request is a system call that requests the OS to write data to the storage device or read data from the storage device. The priority of the I/O request is a numerical value indicating the order in which I/O requests are processed. For example, the OS processes the I/O request with a priority of "1" prior to the I/O request with a priority of "2".

However, even when the priorities of all the I/O requests issued by the DBMSs 3a to 3c are made to be higher simultaneously, it is impossible for the DBMSs 3a to 3c read and write data simultaneously because the DBMSs 3a to 3c share one storage device. Therefore, the service 5 as a whole cannot significantly reduce the time required to read and write data, and it is difficult to reduce the response time.

Embodiment

Figure 3:
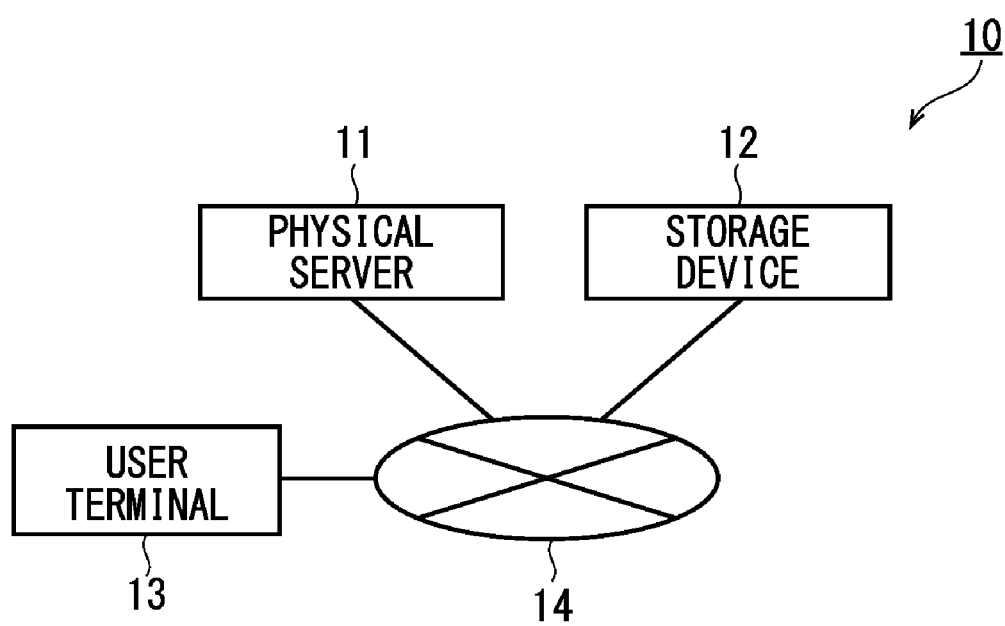
FIG. 3 is a block diagram of a system in accordance with an embodiment.

FIG. 3 is a block diagram of a system in accordance with an embodiment.

A system 10 is a system employing the microservice architecture, and provides a service of an SNS. The system 10 may provide one of the following services; electronic commerce, Internet banking, and online gaming instead of the SNS.

As an example, the system 10 includes a physical server 11 and a storage device 12. The physical server 11 is a computing device that executes various programs for implementing the microservice architecture. The storage device 12 is hardware for implementing a database in the system 10.

The physical server 11 and the storage device 12 are interconnected through a network 14 such as a local area network (LAN) or the Internet.

Users of the service can use the service such as an SNS provided by the system 10 by connecting their user terminals 13 such as smartphones to the network 14.

Figure 4:
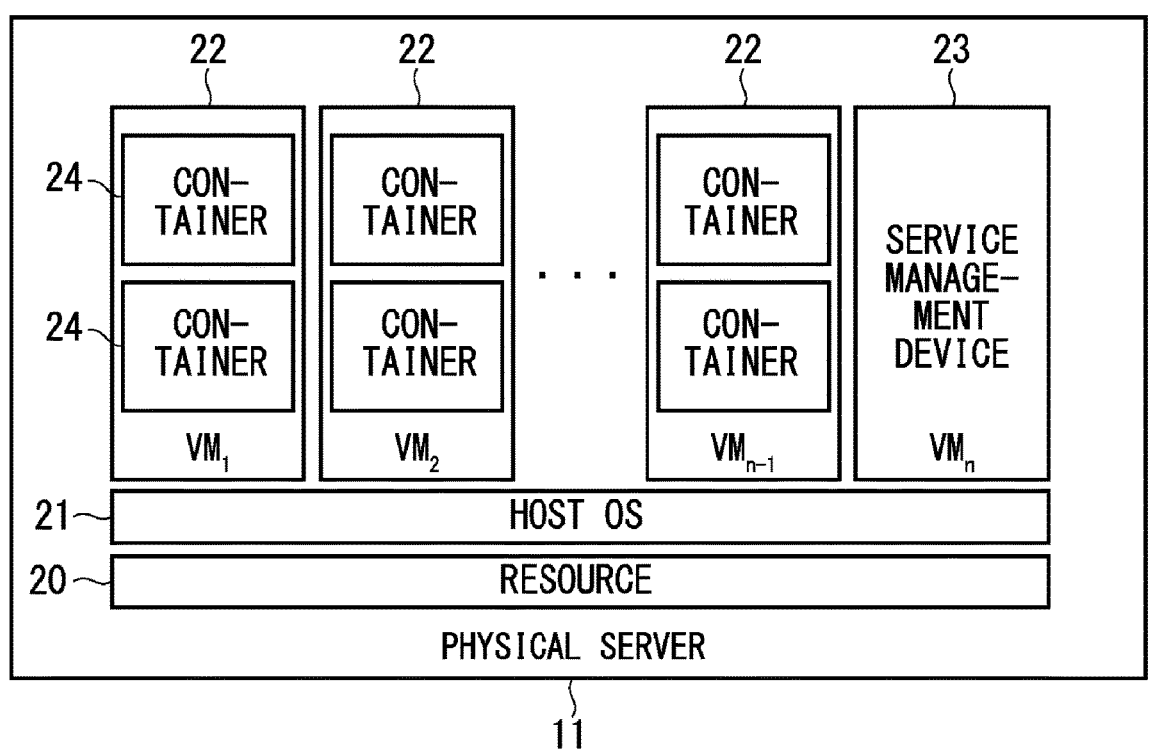
FIG. 4 is a schematic diagram of a physical server in accordance with the embodiment.

FIG. 4 is a schematic diagram of the physical server 11.

As illustrated in FIG. 4, the physical server 11 includes a physical resource 20 such as a central processing unit (CPU) and a memory, and the resource 20 executes a host OS 21.

Furthermore, the physical server 11 boots virtual machines 22 on the host OS 21. Hereinafter, individual virtual machines 22 are identified using characters such as "$VM_1$", "$VM_2$", ..., "$VM_n$". In addition, in this embodiment, the virtual machine identified by "$VM_n$" is used as a service management device 23. The service management device 23 has a function to reduce the response time of the service provided by the system 10 as described later. Instead of implementing the service management device 23 with the virtual machine, a physical server different from the physical server 11 may be used as the service management device 23.

Each virtual machine 22 creates containers 24 using a part of the resource 20. DOCKER (registered trademark) is one of examples of the container engine used by each virtual machine 22 to create the container 24. Each container executes a program for implementing the service provided by the system 10.

Figure 5:
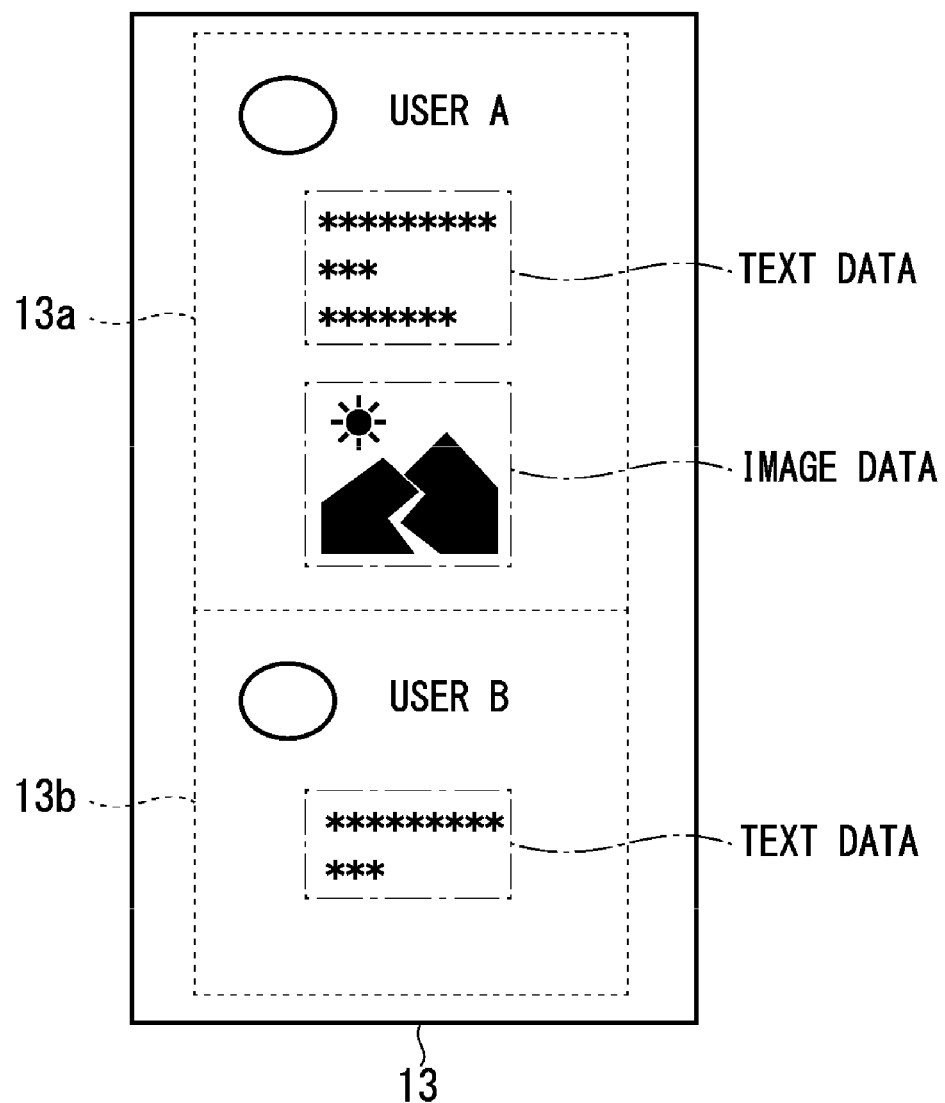
FIG. 5 schematically illustrates a screen display of a user terminal in accordance with the embodiment.

FIG. 5 schematically illustrates a screen display of the user terminal 13.

In this example, a first article 13a and a second article 13b are displayed on the screen of the user terminal 13. The first article 13a is an article that the user A of the user terminal 13 is going to post, and includes text data and image data.

The second article 13b is an article posted by the user B different from the user A. In this example, the second article 13b is composed of only text data.

Figure 6:
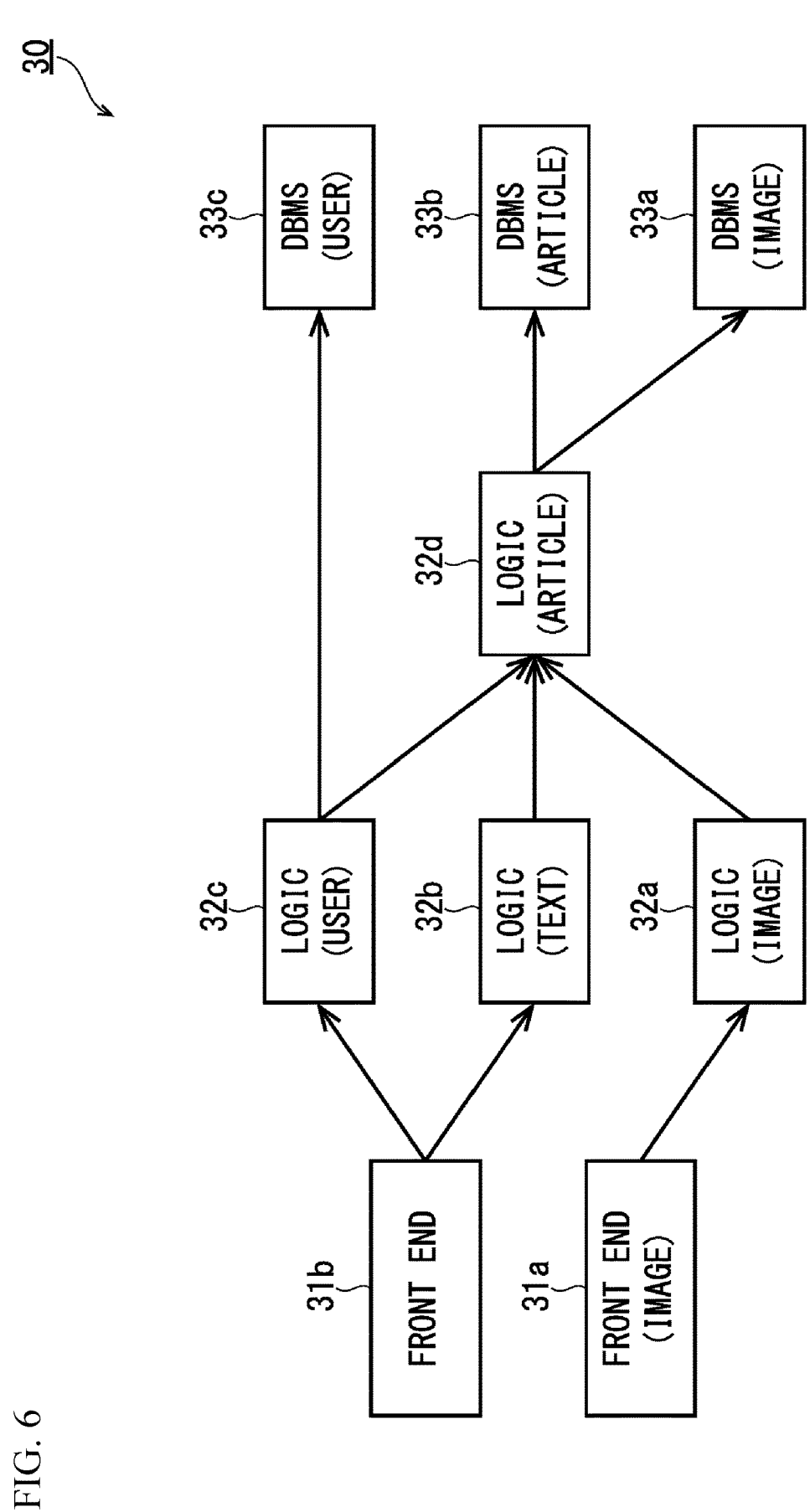
FIG. 6 is a schematic diagram of a service provided by the system in accordance with the embodiment.

FIG. 6 is a schematic diagram of a service 30 provided by the system 10.

In this example, the service 30 is implemented by respective programs of front ends 31a and 31b, logics 32a to 32d, and database management systems (DBMSs) 33a to 33c. These programs am executed in different containers 24. For example, the front end 31a is executed by one of the containers 24 of the virtual machine 22 identified by "$VM_1$", and the front end 31b is executed by one of the containers 24 of the virtual machine 22 identified by "$VM_2$".

The front end 31a is a program that receives the image data included in the first article 13a (see FIG. 5) from the user terminal 13. The front end 31b is a program that receives the text data included in the first article 13a from the user terminal 13. The front end 31b also receives user information, which is a combination of a user name and a password, from the user terminal 13.

The user terminal 13 allocates data to the front end 31a or 31b as described above, depending on whether the type of data is image data or data other than image data.

The logic 32a is a program that performs a predetermined process on the image data received by the front end 31a. The logic 32b is a program that performs a predetermined process on the text data received by the front end 31b. The logic 32c is a program that performs user authentication based on the user information received by the front end 31b. The logic 32d is a program that generates the first article 13a (see FIG. 5) that incorporates the text data and the image data when the user authentication succeeds.

The DBMS 33a is a program that stores the image data in the storage device 12 (see FIG. 3). The DBMS 33b is a program that stores the first article 13a in the storage device 12. The DBMS 33c is a program that stores the user information in the storage device 12.

The arrows in FIG. 6 indicate paths connecting programs that are in caller-callee relationship, and indicate that the program at the origin of the arrow calls the program at the tip of the arrow. For example, the arrow between the front end 31a and the logic 32a indicates that the front end 31a calls the logic 32a.

Figure 7:
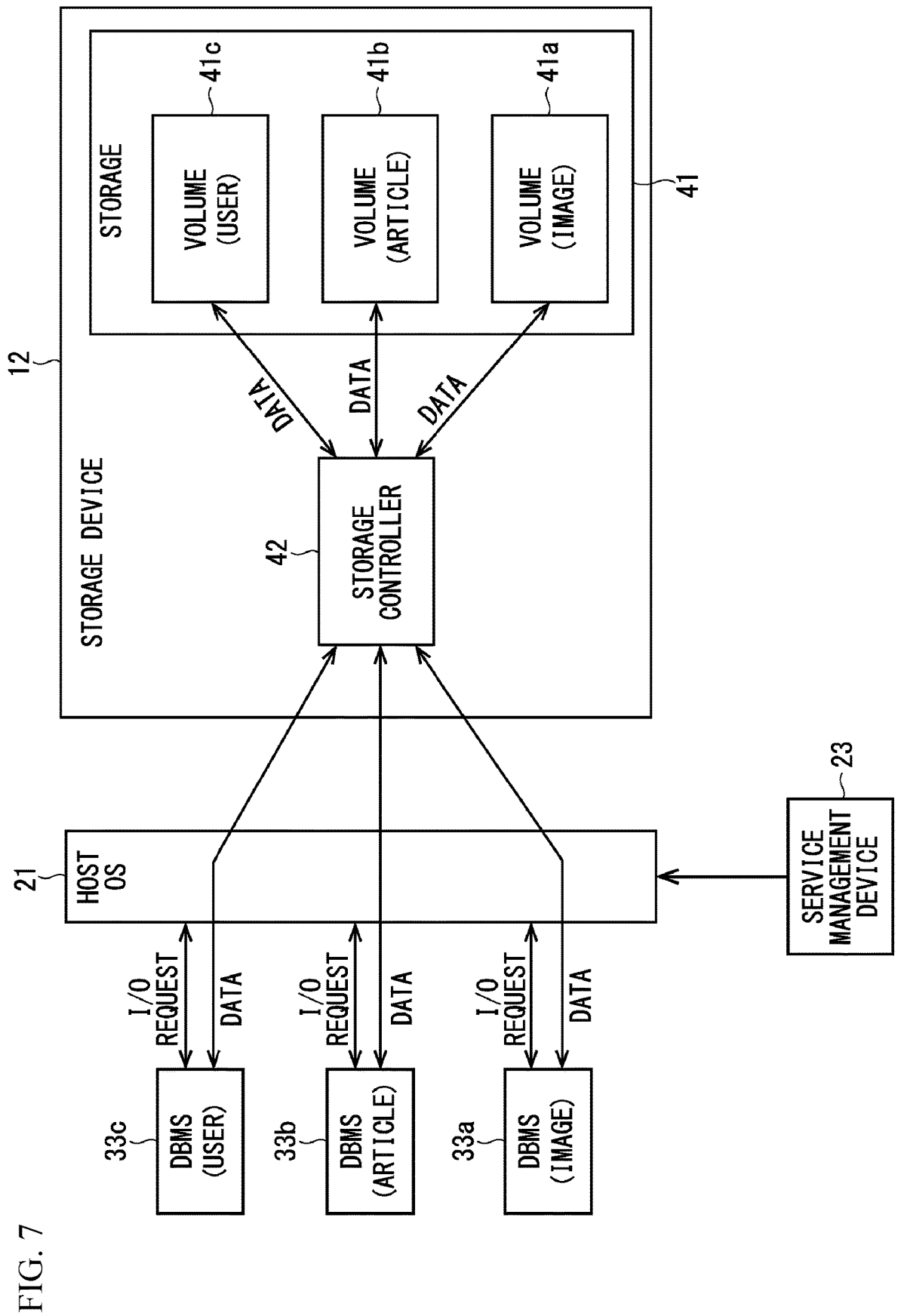
FIG. 7 is a schematic diagram of a DBMS, a host OS, and a storage device in accordance with the embodiment.

FIG. 7 is a schematic diagram of the DBMSs 33a to 33c, the host OS 21, and the storage device 12.

As illustrated in FIG. 7, the storage device 12 includes a storage 41 and a storage controller 42. The storage 41 is hardware such as a hard disk or a semiconductor storage device that stores various types of data, and includes volumes 41a to 41c.

The volume 41a is a storage area to and from which the DBMS 33a writes and reads data. As an example, the volume 41a stores the image data. The volume 41b is a storage area to and from which the DBMS 33b writes and reads data, and stores the first article 13a. The volume 41c is a storage area to and from which the DBMS 33c writes and reads data, and stores the user information.

The storage controller 42 is hardware that writes and reads data to and from the volumes 41a to 41c.

Next, a description will be given of a flow of processing when the storage device 12 writes and reads data.

First, each of the DBMSs 33a to 33c issues an I/O request to the host OS 21. The I/O request is a system call that requests the host OS 21 to write data to the storage 41 or read data from the storage 41.

The host OS 21 that has received the I/O requests processes the I/O requests in order of priority. The priority is a numerical value determined by the developer of the system 10 for each of the volumes 41a to 41c, and indicates the processing order in which data is written or read, Instead of the host OS 21, the storage controller 42 may process the I/O request. In this case, the storage controller 42 processes the I/O requests in order of priority.

The host OS 21 instructs the storage controller 42 to write or read data to or from the storage 41 in order of priority, starting with the I/O request with the highest priority. For example, a case where the host OS 21 receives, from all of the DBMSs 33a to 33c, the I/O requests that request writing of data is now discussed. In this case, the host OS 21 identifies the I/O request with the highest priority from among all of the I/O requests, and instructs the storage controller 42 to write data according to the I/O request with the highest priority to the storage 41. For example, when the I/O request of the DBMS 33a has the highest priority, the host OS 21 instructs the storage controller 42 to write data to the volume 41a before processing other I/O requests.

However, the developer of the system 10 does not always set the highest priority to the I/O request pertaining to the volume that takes the largest time to write and read data among the volumes 41a to 41c. Therefore, when the priorities of the I/O requests determined by the developer of the system 10 are used without change, it is difficult to reduce the response time of the system 10. Thus, the service management device 23 instructs the host OS to change the priorities of the I/O requests as follows.

Next, a description will be given of a service management method in accordance with the embodiment.

Figure 8:
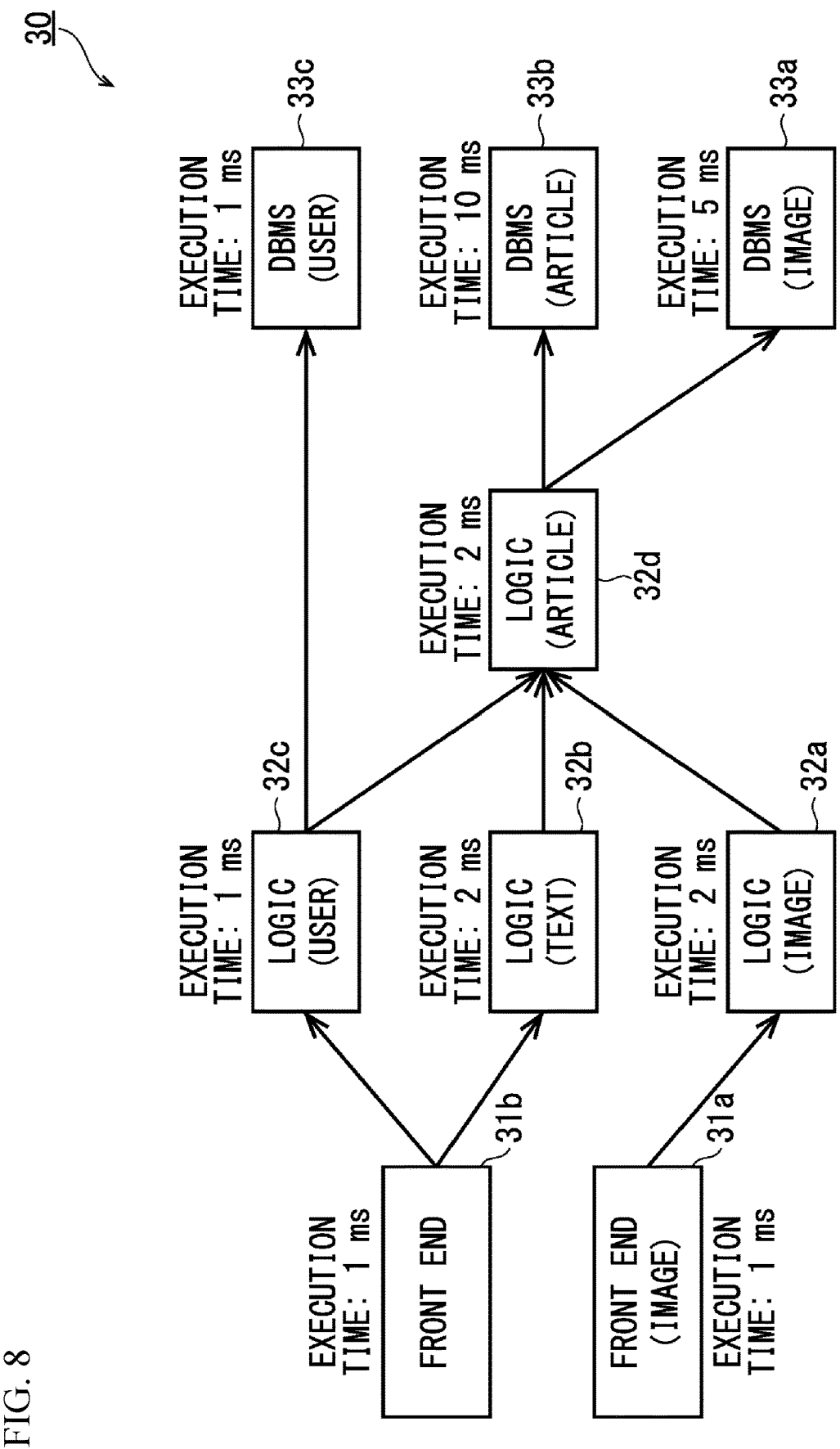
FIG. 8 is a schematic diagram (No. 1) illustrating a service management method in accordance with the embodiment.
Figure 9:
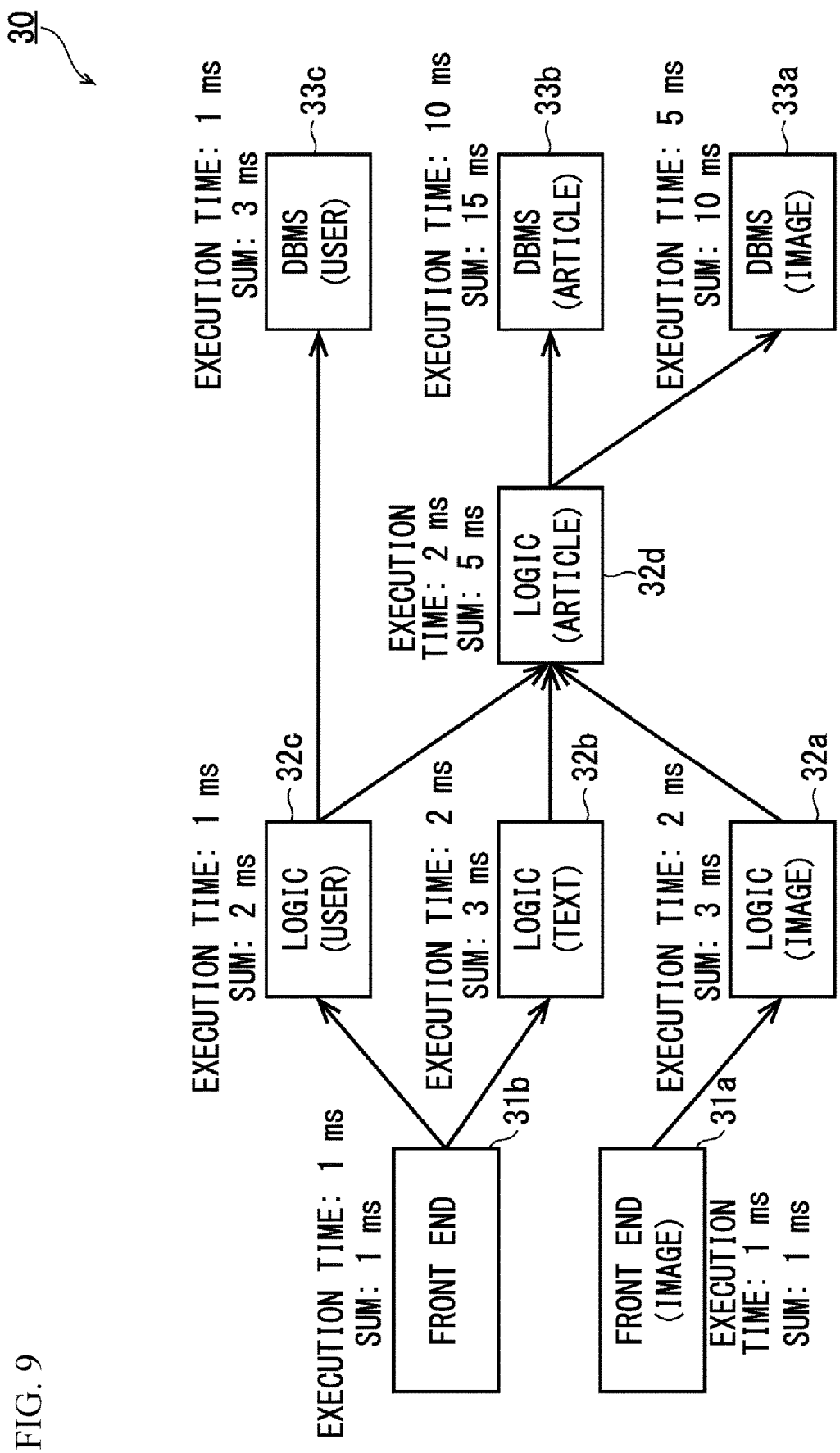
FIG. 9 is a schematic diagram (No. 2) illustrating the service management method in accordance with the embodiment.
Figure 10:
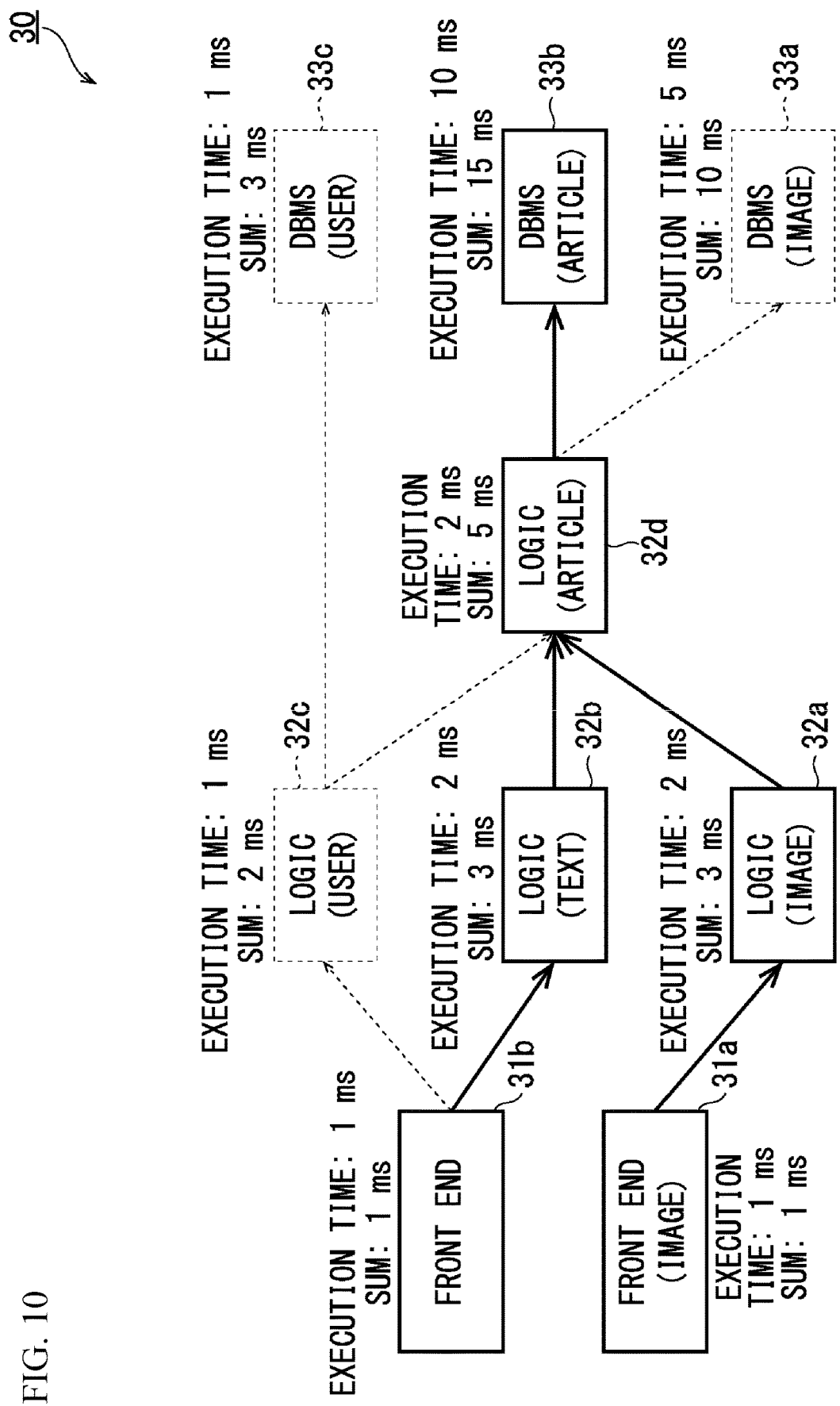
FIG. 10 is a schematic diagram (No. 3) illustrating the service management method in accordance with the embodiment.

FIG. 8 to FIG. 10 are schematic diagrams illustrating the service management method in accordance with the embodiment.

As illustrated in FIG. 8, the service management device 23 measures execution times of the respective programs of the front ends 31a and 31b, the logics 32a to 32d, and the DBMSs 33a to 33c.

Then, as illustrated in FIG. 9, the service management device 23 calculates the sum of the execution times along each of paths connecting the programs in caller-callee relationship.

For example, consider the path: the front end 31a->the logic 32a->the logic 32d->the DBMS 33a. In this case, first, the service management device 23 calculates a first sum (1 ms+2 ms=3 ms) of respective execution times of the front end 31a and the logic 32a. Then, the service management device 23 calculates a second sum (3 ms+2 ms=5 ms) by adding the execution time of the logic 32d to the first sum. Further, the service management device 23 calculates a third sum (5 ms+5 ms=10 ms) by adding the execution time of the DBMS 33a to the second sum. Accordingly, the sum of the execution times in the path: the front end 31a->the logic 32a->the logic 32d->the DBMS 33a is 10 ms.

Three paths: the front end 31a->the logic 32a->the logic 32d, the front end 31b->the logic 32b->the logic 32d, and the front end 31b->the logic 32c->the logic 32d end at the logic 32d. In this case, the service management device 23 determines, as the sum in the logic 32d, the largest sum among three sums each calculated along the corresponding one of the three paths.

Therefore, the sum of the execution times along the path ending at the DBMS 33b is 15 ms. In addition, the sum of the execution times along the path ending at the DBMS 33c is 3 ms.

Then, as illustrated in FIG. 10, the service management device 23 identifies the program that has the largest sum of the execution times among the DBMSs 33a to 33c. In FIG. 10, the path that has the largest sum of the execution times and the programs in the way of the path are indicated by solid lines.

In this example, since the sum of the execution times along the path ending at the DBMS 33b is 15 ms and largest, the service management device 23 identifies the DBMS 33b.

The DBMS 33b is a program that writes and reads data to and from the volume 41b (see FIG. 7). Thus, the service management device 23 identifies the volume 41b as the volume having the largest influence on the response time of the service 30 among the volume 41a to 41c. The volume having the largest influence on the response time of the service 30 is an example of a first volume.

Then, the service management device 23 notifies the host OS 21 of an instruction to set the priority of the I/O request to the volume 41b higher than the priorities of the I/O requests to other volumes 41a and 41c. Volumes 41a and 41c are examples of second volumes.

As a result, writing and reading of data to and from the volume 41b having the largest influence on the response time is executed before writing and reading of data to and from other volumes 41a and 41c, therefore inhibiting the response time of the service 30 from being delayed.

Next, a description will be given of a functional configuration of the service management device 23.

Figure 11:
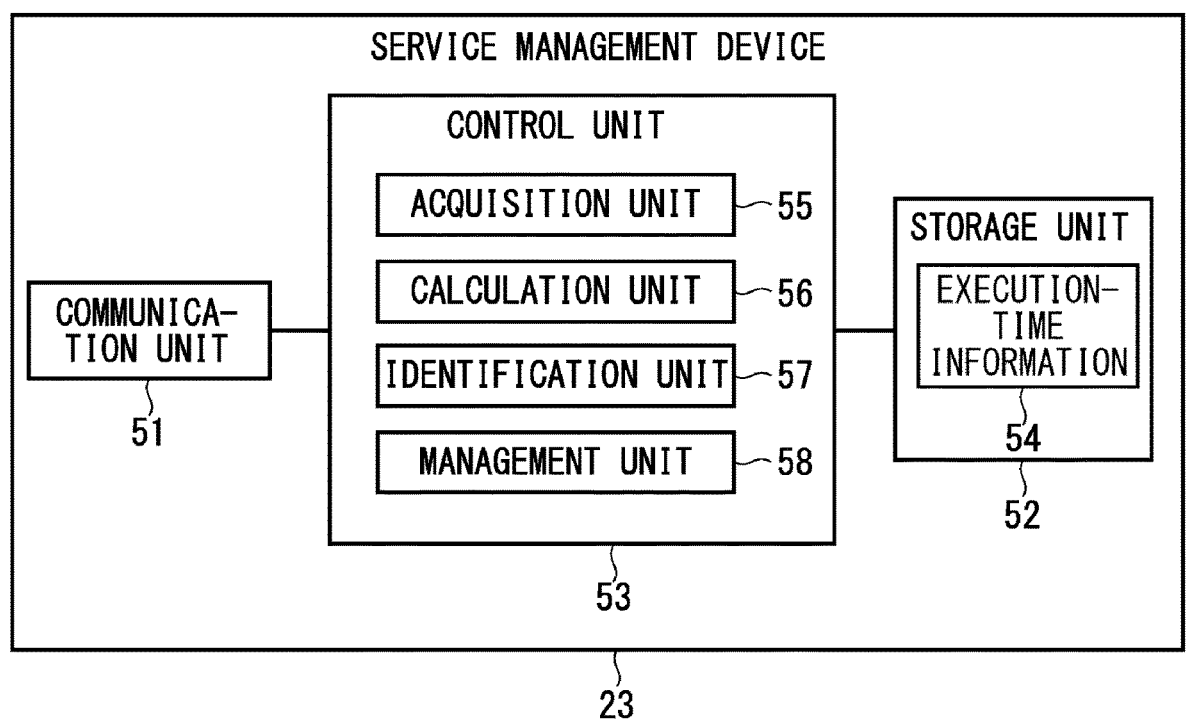
FIG. 11 is a functional block diagram of a service management device in accordance with the embodiment.

FIG. 11 is a functional block diagram of the service management device 23.

As illustrated in FIG. 11, the service management device 23 includes a communication unit 51, a storage unit 52, and a control unit 53.

The communication unit 51 is an interface for connecting the service management device 23 to the network 14 (see FIG. 3). The storage unit 52 stores execution-time information 54.

FIG. 12 schematically illustrates the execution-time information 54.

As illustrated in FIG. 12, the execution-time information 54 is information in which each of the respective programs of the front ends 31a and 31b, the logics 32a to 32d, and the DBMSs 33a to 33c is associated with its execution time. The sum described in FIG. 10 is also stored in the execution-time information 54 in association with each program.

Referring back to FIG. 11, the description is continued.

The control unit 53 is a processing unit that controls each component of the service management device 23. As an example, the control unit 53 includes an acquisition unit 55, a calculation unit 56, an identification unit 57, and a management unit 58.

As illustrated in FIG. 8, the acquisition unit 55 is a processing unit that acquires the execution time of each of the respective programs of the front ends 31a and 31b, the logics 32a to 32d, and the DBMSs 33a to 33c. As an example, when the user terminal 13 posts an article to the service 30, the acquisition unit 55 acquires, as the execution time, the time from when the font end 31a receives a process to when the front end 31a completes the process. The acquisition unit 55 also acquires respective execution times of the programs other than the front end 31a in the same manner.

Additionally, the acquisition unit 55 stores the acquired execution time in the execution-time information 54 in association with the corresponding program.

The calculation unit 56 identifies paths each connecting the programs in caller-callee relationship among the respective programs of the front ends 31a and 31b, the logics 32a and 32d, and the DBMSs 33a to 33c. Then, the calculation unit 56 calculates the sum of the execution times along each path as described in FIG. 9, and stores the calculated sum in the execution-time information 54 in association with the corresponding program.

The identification unit 57 is a processing unit that identifies the volume having the largest influence on the response time of the service 30 among the volumes 41a to 41c based on the respective execution times of the programs. For example, the identification unit 57 identifies, as the volume having the largest influence on the response time, the volume 41b to and from which the DBMS 33b, which has the largest sum of the execution times in the execution-time information 54, writes and reads data. The volume 41b, which is subjected to writing and reading by the DBMS 33b having the largest sum of the execution times in the execution-time information 54, is an example of a third volume.

The management unit 58 is a processing unit that sets the priority of the I/O request to the volume identified by the identification unit 57 higher than the priorities of the I/O requests to other volumes. As an example, a case where the volume identified by the identification unit 57 is the volume 41b as described above is now discussed. In this case, the management unit 58 notifies the host OS 21 of an instruction to set the priority of the I/O request to the volume 41b higher than the priorities of the I/O requests to other volumes 41a and 41c. When the storage 13 controller 42 processes the I/O request, the management unit 58 may notify the storage controller 42 of the instruction to set the priority higher.

Next, a description will be given of the service management method in accordance with the present embodiment.

Figure 13:
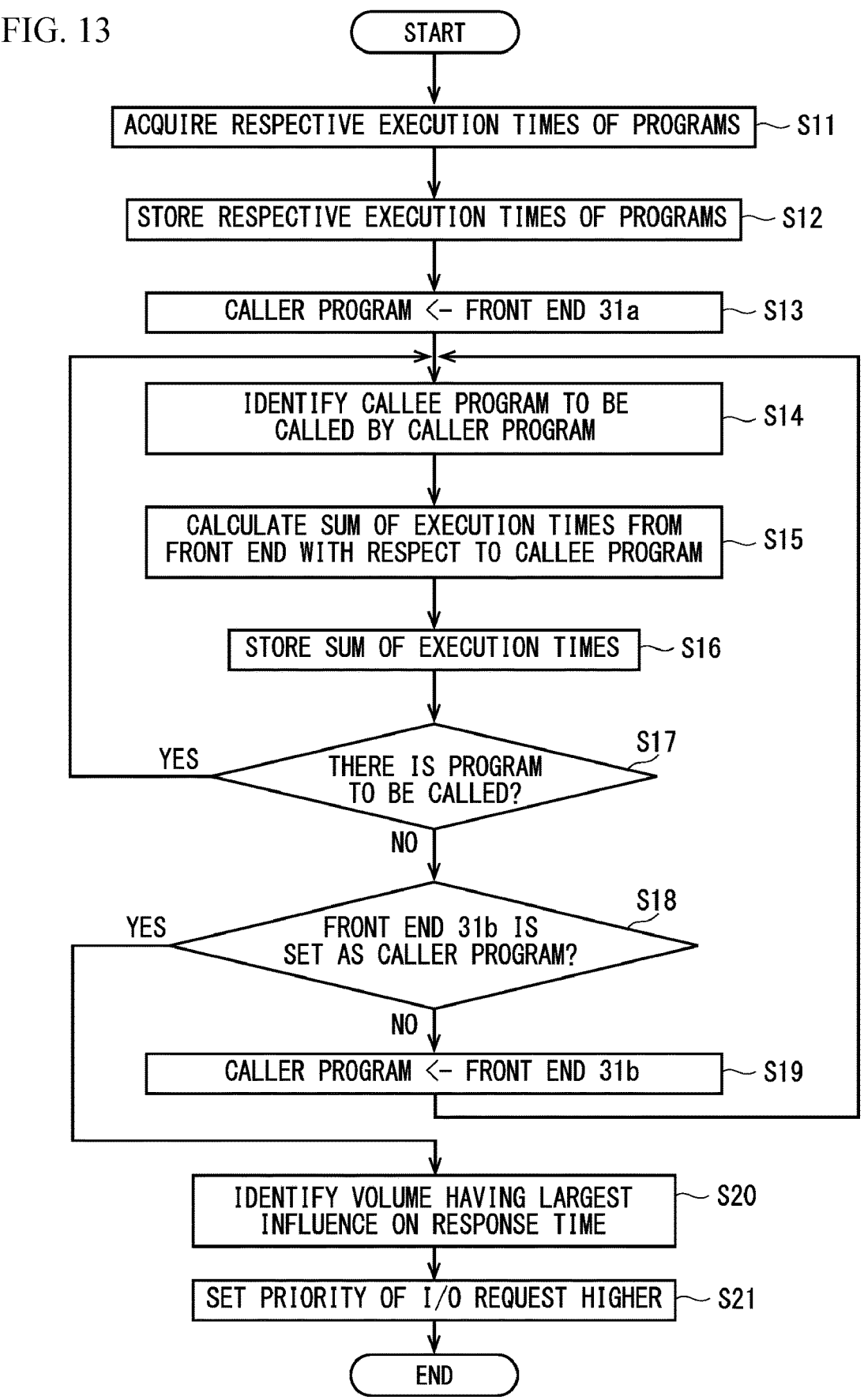
FIG. 13 is a flowchart of the service management method in accordance with the embodiment.

FIG. 13 is a flowchart of the service management method in accordance with the embodiment.

First, the acquisition unit 55 acquires the execution time of each of the respective programs of the front ends 31a and 31b, the logics 32a to 32d, and the DBMSs 33a to 33c (step S11).

Then, each of the execution times acquired by the acquisition unit 55 is stored in the execution-time information 54 in association with the corresponding program (step S12).

Then, the calculation unit 56 sets the front end 31a as a caller program (step S13).

Then, the calculation unit 56 identifies a callee program to be called by the caller program (step S14). When the step S14 is executed for the first time, since the front end 31a is set as the caller program, the callee program is the logic 32a.

Next, the calculation unit 56 calculates the sum of the execution times from the front end with respect to the callee program identified in the step S14 by referencing the execution-time information 54 (step S15). When the step S15 is executed for the first time, the front end is the front end 31a, and the callee program is the logic 32a. Therefore, the calculation unit 56 calculates the sum (3 ms) obtained by adding up the execution time (1 ms) of the front end 31a and the execution time (2 ms) of the logic 32a as described in FIG. 8.

Then, the calculation unit 56 stores the sum calculated in the step S15 in the execution-time information 54 in association with the program (step S16).

Then, the calculation unit 56 determines whether there is a program to be called by the callee program identified in the step S14 (step S17). When the step S17 is executed for the first time, since the logic 32a, which is the callee program, further calls the logic 32d, the calculation unit 56 determines that there is a program to be called (YES). When it is determined that there is a program to be called (step S17: YES), the process returns to the step S14.

By contrast, when the callee program identified in the step S14 is any of the DBMSs 33a to 33c, there is no program to be called by them. Therefore, the calculation unit 56 determines that there is no program to be called (NO). When it is determined that there is no program to be called (step S17: NO), the process proceeds to the step S18.

In the step S18, the calculation unit 56 determines whether the front end 31b is set as a caller program. When the calculation unit 56 determines that the front end 31b is not set as a caller program (step S18: NO), the process proceeds to the step S19.

In the step S19, the calculation unit 56 sets the front end 31b as a caller program. Thereafter, the process returns to the step S14 again.

By contrast, when the calculation unit 56 determines that the front end 31b is set as a caller program (step S18: YES), the process proceeds to the step S20.

In the step S20, the identification unit 57 identifies, as the volume having the largest influence on the response time of the service 30, the volume to and from which the DBMS having the largest sum of the execution times in the execution-time information 54 writes and reads data.

Then, the management unit 58 sets the priority of the I/O request to the volume identified in the step S20 higher than the priorities of the I/O requests to other volumes (step S21).

In the above manner, the basic steps in the service management method in accordance with the embodiment are completed.

In the embodiment described above, in the step S21, the management unit 58 sets the priority of the I/O request to the volume having the largest influence on the response time of the service 30 among the volumes 41a to 41c higher than the priorities of the I/O requests to other volumes. Thus, writing and reading of data to and from the volume having the largest influence on the response time of the service 30 is performed prior to writing and reading of data to and from other volumes, therefore, inhibiting the response time of the service 30 from being delayed.

Furthermore, in the step S20, the identification unit 57 identifies, as the volume having the largest influence on the response time of the service 30, the volume to and from which the DBMS having the largest sum of the execution times writes and reads data. The sum of the execution times has a direct influence on the response time. Therefore, the identification unit 57 can identify the volume that becomes a bottleneck that delays the response time.

Hardware Configuration

Figure 14:
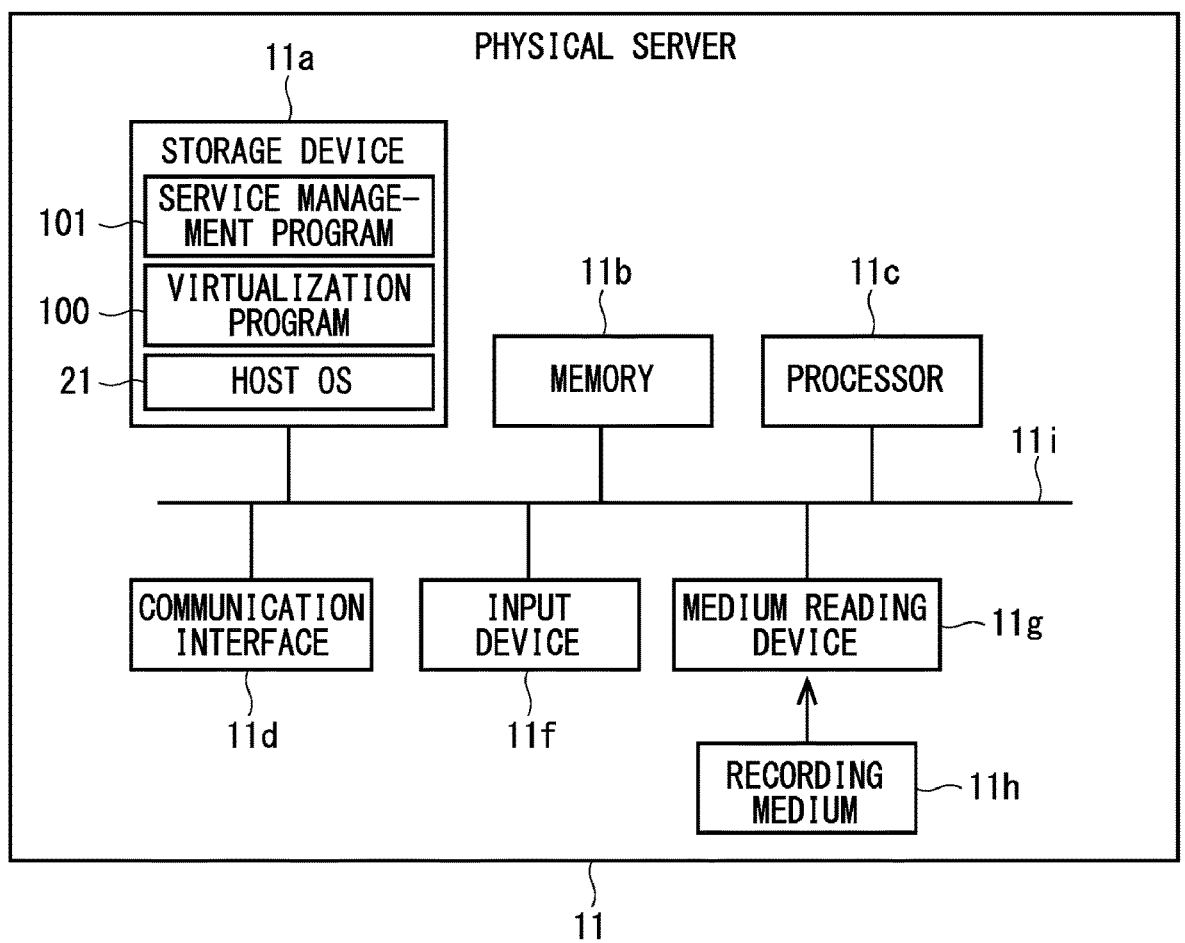
FIG. 14 is a hardware configuration diagram of the physical server in accordance with the embodiment.

FIG. 14 is a hardware configuration diagram of the physical server 11.

As illustrated in FIG. 14, the physical server 11 includes a storage device 11a, a memory 11b, a processor 11c, a communication interface 11d, an input device 11f, and a medium reading device 11g. These components are connected to each other through a bus 11i.

The storage device 11a is a non-volatile storage such as a hard disk drive (HDD) and a solid state drive (SSD), and stores the host OS 21, a virtualization program 100, and a service management program 101. Each virtual machine 22 (see FIG. 4) is implemented by the memory 11b and the processor 11c cooperatively executing the virtualization program 100.

The service management program 101 is a program that causes the virtual machine indicated by "$VM_n$" in FIG. 4 to function as the service management device 23.

Alternatively, the service management program 101 may be recorded in a computer-readable recording medium 11h, and the processor 11c may be made to read the service management program 101 from the computer-readable recording medium 11h through the medium reading device 11g.

Such a recording medium 11h may be a physically portable recording medium such as a compact disc—read only memory (CD-ROM), a digital versatile disc (DVD), or a universal serial bus (USB) memory, for example. Also, a semiconductor memory such as a flash memory, or a hard disk drive may be used as the recording medium 11h. Such a recording medium 11h is not a temporary medium such as carrier waves not having a physical form.

Further, the service management program 101 may be stored in a device connected to a public line, the Internet, a LAN, or the like. In this case, the processor 11c allocated to the virtual machine indicated by "$VM_n$" in FIG. 4 reads and executes the service management program 101.

Meanwhile, the memory 11b is hardware that temporarily stores data like a dynamic random access memory (DRAM) or the like. The service management program 101 is loaded into the memory 11b allocated to the virtual machine indicated by "$VM_n$" in FIG. 4.

The processor 11c is hardware such as a central processing unit (CPU) or a graphical processing unit (GPU) that controls the respective components of the physical server 11. The processor 11c and the memory 11b both allocated to the virtual machine indicated by "$VM_n$" in FIG. 4 cooperatively execute the service management program 101.

As the memory 11b and the processor 11c cooperate to execute the service management program 101, the control unit 53 of the service management device 23 (see FIG. 11) is implemented. The control unit 55 includes the acquisition unit 55, the calculation unit 56, the identification unit 57, and the management unit 58.

The storage unit 52 (see FIG. 11) is implemented by the storage device 11a and the memory 11b both allocated to the virtual machine indicated by "$VM_n$" in FIG. 4.

Further, the communication interface 11d is hardware such as a network interface card (NIC) for connecting the physical server 11 to the network 14 (see FIG. 3). The communication unit 51 (see FIG. 11) is implemented by the communication interface 11d allocated to the virtual machine indicated by "$VM_n$" in FIG. 4.

The input device 11f is hardware such as a keyboard and a mouse for allowing the administrator of the service 30 to input various types of data to the physical server 11.

The medium reading device 11g is hardware such as a CD drive, a DVD drive, and a USB interface for reading the recording medium 11h.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A service management device comprising:
   a memory; and
   a processor coupled to the memory and configured to:
      acquire respective execution times of programs that implement a service,
      identify a first volume having a largest influence on a response time of the service based on the respective execution times of the programs, where the first volume being any one of volumes of a storage device, and at least one of the programs writing and reading data to and from the storage device, and
      set a priority of writing and reading of data to and from the first volume higher than priorities of writing and reading of data to and from a second volume that is any one of the volumes other than the first volume.

2. The service management device according to claim 1, wherein the processor is further configured to:
   calculate a sum of the execution times along each of paths, each of the paths connecting a caller program and a callee program among the programs, and
   identify a third volume from among the volumes as the first volume, where the third volume being subjected to writing and reading by a first program, the first program having a largest sum of the execution times among the programs.

3. The service management device according to claim 1, wherein the service is a social networking service (SNS), electronic commerce, Internet banking, or online gaming.

4. A service management method implemented by a computer, the service management method comprising:
   acquiring respective execution times of programs that implement a service;
   identifying a first volume having a largest influence on a response time of the service based on the respective execution times of the programs, where the first volume being any one of volumes of a storage device, and at least one of the programs writing and reading data to and from the storage device; and
   setting a priority of writing and reading of data to and from the first volume higher than priorities of writing and reading of data to and from a second volume that is any one of the volumes other than the first volume.

5. A non-transitory computer-readable storage medium storing a service management program that causes a computer to execute a process, the process comprising:
   acquiring respective execution times of programs that implement a service;
   identifying a first volume having a largest influence on a response time of the service based on the respective execution times of the programs, where the first volume being any one of volumes of a storage device, and at least one of the programs writing and reading data to and from the storage device; and setting a priority of writing and reading of data to and from the first volume higher than priorities of writing and reading of data to and from a second volume that is any one of the volumes other than the first volume.

* * * * *